June 5, 1923.

N. DUPUIS 1,457,731

OCCUPANT PROPELLED VEHICLE

Filed Oct. 31, 1921

3 Sheets-Sheet 1

N. Dupuis
Inventor

By C.A. Snow & Co
Attorney

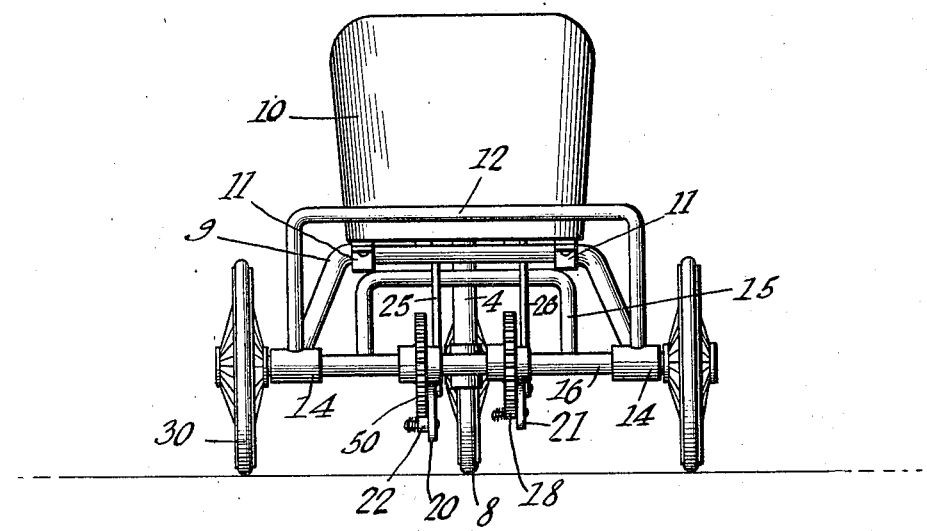
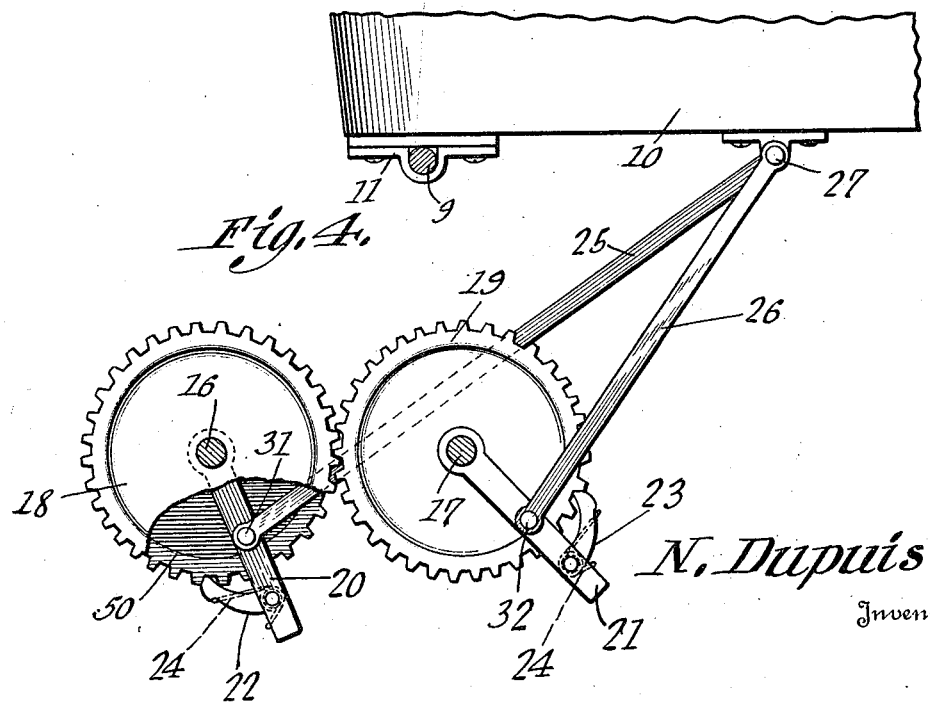

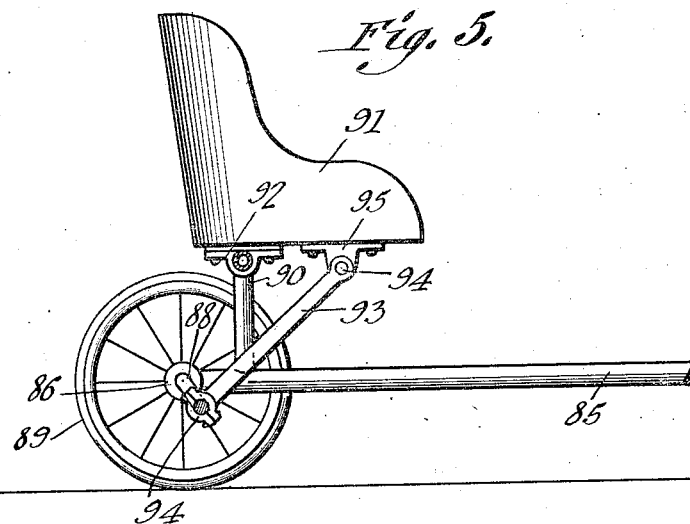
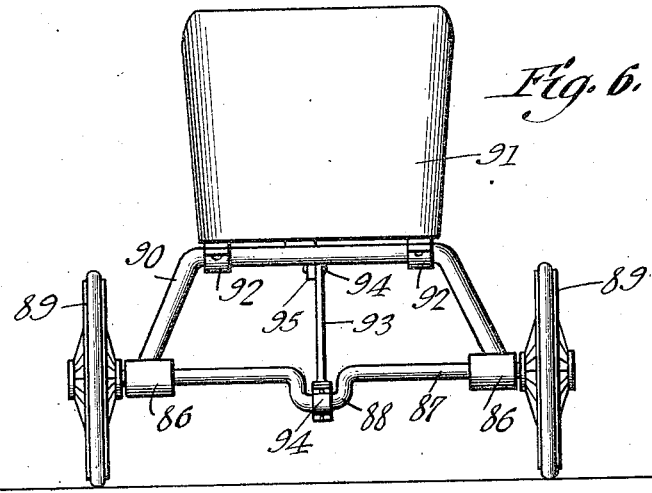
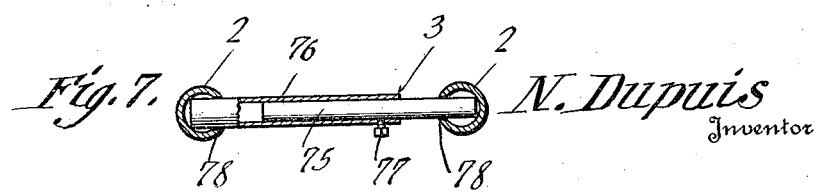

Patented June 5, 1923.

1,457,731

UNITED STATES PATENT OFFICE.

NOËL DUPUIS, OF TACOMA, WASHINGTON, ASSIGNOR OF ONE-HALF TO CHARLES M. KING, OF TACOMA, WASHINGTON.

OCCUPANT-PROPELLED VEHICLE.

Application filed October 31, 1921. Serial No. 511,919.

*To all whom it may concern:*

Be it known that I, NOËL DUPUIS, a citizen of the United States, residing at Tacoma, in the county of Pierce and State of Washington, have invented a new and useful Occupant-Propelled Vehicle, of which the following is a specification.

This invention aims to provide novel means whereby a vehicle may be operated by the rocking movement of a seat.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
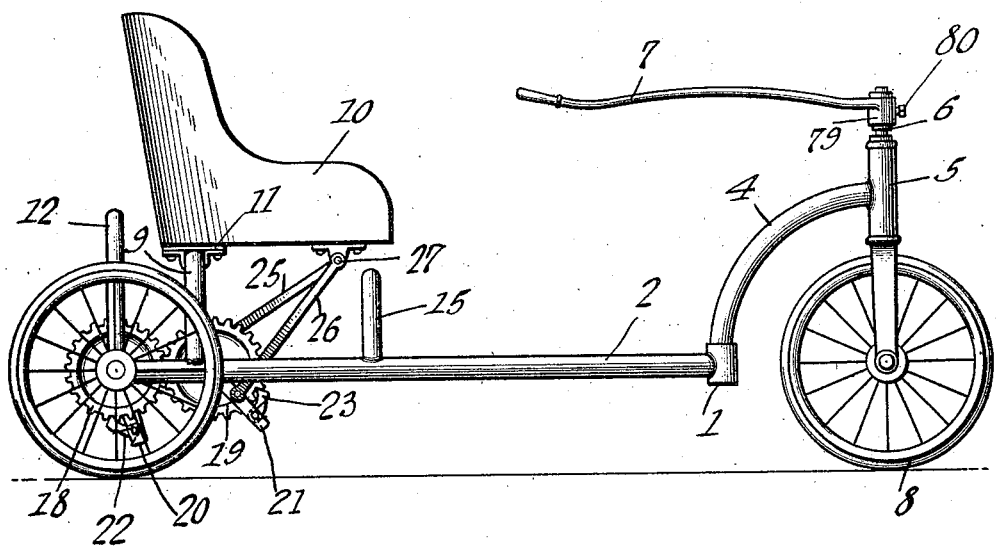
Figure 2:
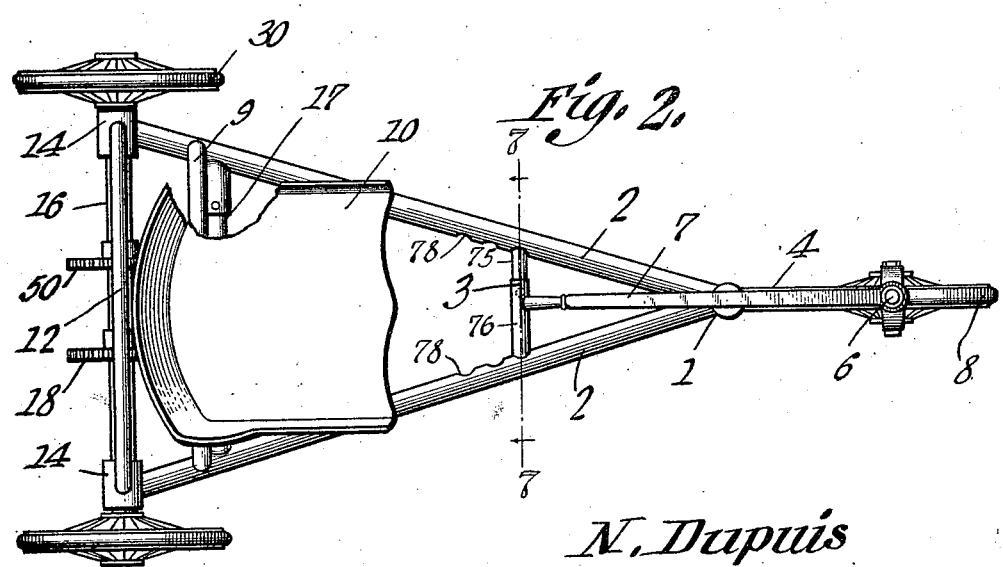

Figure 1 shows in side elevation, a vehicle constructed in accordance with the invention; Figure 2 is a top plan wherein parts are broken away; Figure 3 is a rear elevation; Figure 4 is a diagrammatic elevation showing the mechanism whereby movement is imparted from the seat to the ground wheels of the vehicle; Figure 5 is a fragmental longitudinal section showing a modification; Figure 6 is an end elevation of the structure shown in Figure 5; and Figure 7 is a cross section on the line 7—7 of Figure 2.

In carrying out the invention there is provided a frame, denoted generally by the numeral 1, and comprising rearwardly diverging side bars 2 connected by a foot rest 3. The foot rest 3 may be adjusted in any desired way along the bars 2 to accommodate persons of different statures. Thus it may be expedient to form the foot rest in telescoped parts 75 and 76, the part 76 carrying a set screw 77 engaging the part 75, the bars 2 having openings 78 for the reception of the outer ends of the parts 75 and 76. At its forward end, the frame 1 is provided with an upwardly extended arm 4 carrying a bearing 5 wherein a shaft 6 is mounted to rock, the shaft being under the control of a tiller 7. A ground wheel 8 is journaled on the lower end of the shaft 6. Clearly, through the instrumentality of the tiller 7, the shaft 6 and the ground wheel 8, the vehicle may be steered. The tiller has a collar 79 receiving the shaft 6 and held thereon by a set screw 80, the construction being such that the tiller 7 may be set at any desired angle with respect to the wheel 8.

The side bars 2 of the frame 1 are connected by an arched support 9. The numeral 10 denotes a seat having a bearing 11, the bearing receiving the support 9, and the construction being such that the seat 10 can rock forwardly and backwardly.

At their rear ends, the side bars 2 of the frame 1 are provided with bearings 14 connected by an arched upstanding stop 12. The side bars 2 are connected, further by an arched upstanding stop 15. The stop 12 limits the rearward swinging movement of the seat 10, while the stop 15 limits the forward swinging movement of the seat.

An axle 16 is journaled for rotation in the bearings 14. Wheels are carried by the axle 16. One wheel 30 is loose on the axle 16, the other wheel being fixed to the axle, to obtain the effect of a differential.

The side bars 2 of the frame 1 are connected by a rod or shaft 17. A gear wheel 18 is fixed to the axle 16 and meshes into a pinion 19 journaled on the rod 17. A gear wheel or ratchet 50 is secured to the axle 16. An arm 20 is mounted to swing on the axle 16, an arm 21 being mounted to swing on the shaft 17. A pawl 22 is pivoted to the arm 20 and cooperates with the ratchet wheel 50. A pawl 23 is pivoted on the arm 21 and cooperates with the pinion 19, the pinion, therefore, having the additional function of a ratchet. The pawls 22 and 23 are constrained to coact with their respective wheels by springs 24. A pitman 25 is pivoted at 31 to the arm 20. A pitman 26 is pivoted at 32 to the arm 21. The pitmans 25 and 26 have a common pivotal connection 27 with the seat 10.

When the seat 10 swings downwardly and forwardly on the support 9, the pawl 23 clicks over the pinion 19, the pawl 22 engaging the ratchet wheel 50 and rotating the same, rotation being imparted to the axle 16 and to the ground wheel 30 which is fixed thereto. When the seat 10 swings downwardly and rearwardly on the support 9, the pawl 22 clicks over the ratchet wheel 50, the pawl 23 engaging the pinion 19 and rotating the same, rotation being imparted to the gear wheel 18, and axle 16 and the ground wheel 30 which is fixed to the axle. The construction is such that advancing movement is imparted to the vehicle when the seat 10 swings downwardly and forwardly, and when the seat swings downwardly and rearwardly. The rearward and downward swinging movement of the seat 10 is limited by the stop 12, the forward and downward swinging movement of the seat being limited by the stop 15. The point 27 of connection between the pitmans 25 and 26 and the seat 10 is so located with respect to the axes of the axle 16 and the shaft 17 that the rearward swinging movement of the seat 10 will be more effective in imparting rotation to the axle 16 than is the forward swinging movement of the seat. This operation is advantageous, because when the seat 10 swings rearwardly, not only the weight of the operator, but, as well, the thrust of the operator's legs against the foot rest 3 is brought into play, whereas, when the seat swings forwardly, the weight of the operator, alone, is effective.

In Figures 5 and 6, the frame bars are shown at 85 and carry bearings 86 wherein an axle 87 is journaled; the axle having a crank 88 or the equivalent thereof. One of the wheels 89 is loose on the axle 87, and the other of the wheels is fixed to the axle, as hereinbefore explained. An arched support 90 is mounted on the bars 85; a seat 91 being attached at 92 to the support, for rocking movement. The numeral 93 marks a pitman, provided at one end with a bearing 94 cooperating with the crank 88. The pitman 93 is pivoted at 94 to a bracket 95 on the seat 91. Obviously motion may be imparted to the axle 87, and to the ground wheel which is fixed thereto, by means of the seat 91, the pitman 93 and the crank 88.

I claim:—

1. In a device of the class described, a frame; an axle journaled in the frame; a ground wheel on the axle; a ratchet wheel on the axle; a gear wheel on the axle; a pinion on the frame and meshing with the gear wheel; arms mounted to swing on the axle and on the frame; pawls on the arms and cooperating directly with the ratchet wheel and with the pinion; pitmans pivoted to the arms; a seat mounted to tilt on the frame; and means for connecting the pitmans pivotally with the seat.

2. In a device of the class described, a frame; an axle journaled in the frame; a ground wheel on the axle; a ratchet wheel on the axle; a gear wheel on the axle; a pinion on the frame and meshing with the gear wheel; arms mounted to swing on the axle and on the frame and extended downwardly therefrom; pawls on the arms and cooperating with the ratchet wheel and with the pinion; pitmans pivoted to the arms; a seat mounted adjacent to its rear end to tilt on the frame; and a common pivotal connection between the pitmans and the seat, said connection being located adjacent to the forward edge of the seat.

In testimony that I claim the foregoing as my own, I have hereto affixed my signature in the presence of two witnesses.

NOËL DUPUIS.

Witnesses:
 IRA H. CASE,
 J. A. DUGAN.